(No Model.)
J. FENNING.
POLE STRAP ATTACHMENT.
No. 266,683. Patented Oct. 31, 1882.
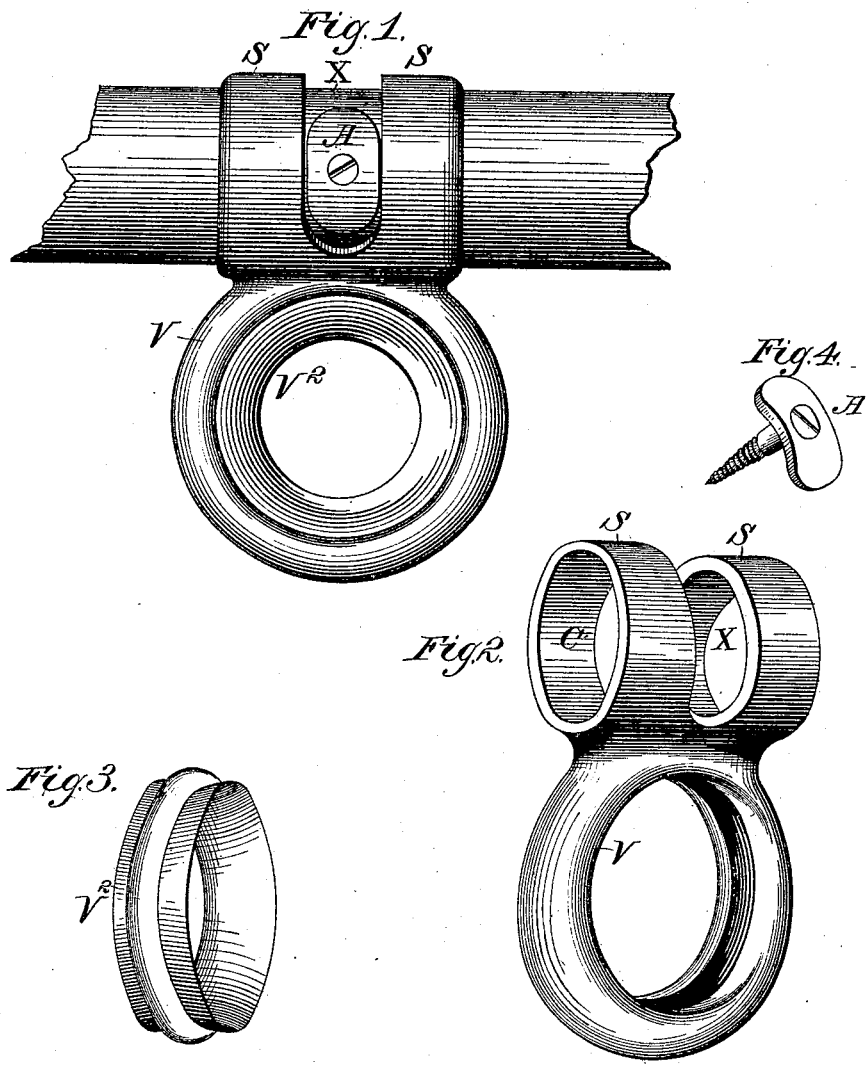
Witnesses.
Henry L. Ryder
William Beth
Inventor.
James Fenning

United States Patent Office.

JAMES FENNING, OF DANBURY, CONNECTICUT.

POLE-STRAP ATTACHMENT.

SPECIFICATION forming part of Letters Patent No. 266,683, dated October 31, 1882.

Application filed July 17, 1882. (No model.)

*To all whom it may concern:*

Be it known that I, JAMES FENNING, a citizen of the United States, residing at Danbury, county of Fairfield, and State of Connecticut, have invented new and useful Improvements in Pole-Rings and Methods of Attaching them to Harness-Yokes; and I do hereby declare that the following is a full, clear, and exact description of the same.

My invention relates to metallic pole-rings attached to the ordinary neck-yoke for the purpose of making a reliable safe support to the pole of carriages or other vehicles, constructed, attached, and operated as described in the following specification and accompanying drawings, in which—

Figure 1 is a vertical representation of the metallic pole-ring attached to the neck-yoke. Fig. 2 is a perspective view of the metallic ring. Fig. 3 is a perspective view of the elastic ring. Fig. 4 is a metal stop and screw.

Fig. 1 represents the metallic pole-ring attached to the neck-yoke. S S represent a divided ring, as hereinafter described. A represents the stop, inserted between the divided ring S S in space X, properly adjusted to prevent rattle, and firmly fastened to the neck-yoke by means of the screw or bolt. This top thus adjusted prevents the ring from working in the longitudinal direction on said neck-yoke, but readily allows the same to turn in a circular direction on said yoke.

Fig. 2 represents the metallic divided ring S S for inserting the neck-yoke, having space X for the purpose of inserting the stop A, as described in Fig. 1. The lower portion of the metallic pole-ring consists of a circular ring, V, for inserting the pole of the vehicle when in operation. Within this circular ring is inserted a pliable or elastic ring, $V^2$, made of rubber or other pliable or elastic substance, for the purpose of avoiding concussion or rattle of the pole, as well as preventing the friction on the pole and the consequences thereof. For the purpose of inserting this elastic or pliable ring the pole-ring is made of a concave form on the inner circle, so that the circular or convex form of the outer circle of said rubber or elastic ring, made of proper size and shape, is readily inserted into the said concave form of said metallic ring and readily held therein, either by the elastic or expansive qualities of said ring or by proper adhesive substances.

Having thus described my invention, what I claim as new is—

1. The metallic pole-ring, consisting of the divided ring S S and a ring, V, at a right angle thereto, in combination with a neck-yoke and stop A, substantially as described.

2. The metallic pole-ring, consisting of the divided ring S S, the metallic ring V, and the elastic ring $V^2$, in combination with the neck-yoke and stop A, as and for the purpose set forth.

3. The metallic pole-ring, comprising the divided ring S S, the metallic ring V, at a right angle thereto, the latter provided with an inner elastic ring, $V^2$, and the whole adapted to be applied to a neck-yoke substantially in the manner and for the purpose set forth.

JAMES FENNING.

Witnesses:
TIMOTHY JONES,
DAVID B. BOOTH.